INVENTOR.
JAMES W. STEINER
BY Philip M. Bolton
ATTORNEY

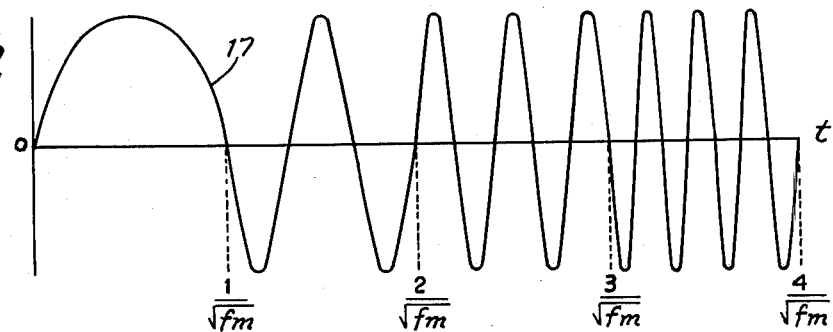
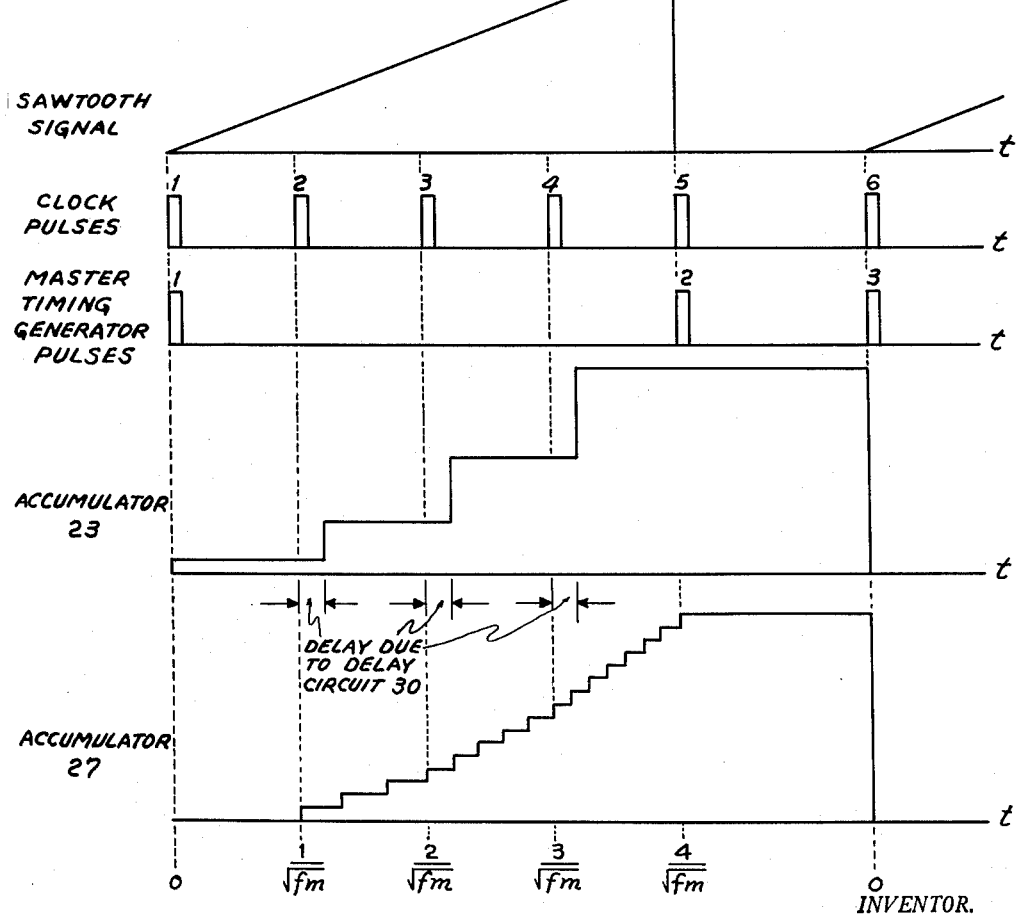

United States Patent Office 3,144,623
Patented Aug. 11, 1964

3,144,623
FREQUENCY GENERATOR SYSTEM
James W. Steiner, West Caldwell, N.J., assignor to International Telephone and Telegraph Corporation, Nutley, N.J., a corporation of Maryland
Filed Feb. 12, 1960, Ser. No. 8,315
12 Claims. (Cl. 331—178)

This invention relates to frequency generator systems, and more particularly to a frequency generator system whose output frequency varies in a predetermined manner.

In certain radar systems it is necessary to frequency modulate the system transmitter in a manner that produces a frequency deviation with respect to time of the transmitter output frequency. The frequency deviation of the output frequency with respect to time is known as the sweep frequency or the ramp frequency. The tolerance requirements of such frequency deviations are severe, and since the duration of the sweep frequency is usually very long by conventional radar standards, the tolerances required are beyond those obtainable with currently available FM modulators.

To illustrate the above, consider a specific case of a radar transmitter with an operating frequency of 500 mc. This operating frequency must be modulated to produce a linear sweep frequency which has a peak deviation of 0.5 mc. after a duration of 0.25 second. The required linearity is 1 cycle of phase at any point during the duration of the sweep frequency. It is noted that the tolerance is expressed in terms of phase rather than frequency. Since phase is the integral of frequency a phase tolerance is much less severe than a frequency tolerance; nevertheless, the phase tolerance is two parts in a million, which represents an impossible requirement for conventional frequency or phase modulators currently available.

An object of the present invention is to provide an improved frequency generator system whose output frequency varies in a highly accurate predetermined manner.

Another object of the present invention is to provide an improved frequency generator system whose output frequency is controlled by digital circuit techniques.

A feature of the present invention is the provision of a varying frequency generator whose output varies in a predetermined manner comprising a source of varying frequency signal, means responsive to said source to produce a digital signal having a value related to the frequency variations of said source, means to produce a digital reference signal which varies in accordance with the desired predetermined variations of said varying frequency, common means coupled to said responsive means and said means to produce to compare the digital signals therefrom to derive an error signal, and means to couple said error signal to said source of varying frequency signal to correct for said error.

Another feature of the present invention is the provision of a frequency generator system whose output varies in a predetermined manner comprising a source of varying frequency signal, a source of stable frequency signal, means responsive to the varying frequency signal and the stable frequency signal to produce a varying difference frequency signal, means for producing a comparison signal varying in accordance with the predetermined variation of the difference frequency signal, means for comparing the comparison signal and the difference frequency signal to produce an error signal upon the occurrence of an error in the difference frequency signal, and means to couple the error signal to the source of varying frequency signal to correct for the error.

A further feature of the present invention is the provision of a system as described in the above paragraph in which an extremely fine control is obtained by generating a digital type comparison signal, converting the difference frequency signal into a digital signal, and comparing on a digital basis the two digital signals to obtain an error signal maintaining the desired small tolerances of frequency deviation.

The above mentioned and other features and objects of this invention will become more apparent by reference to the following description taken in conjunction with the accompanying drawings, in which:

FIG. 2 is a curve useful in explaining the operation of the embodiment of the invention shown in FIG. 1; and FIG. 3 is a time diagram useful in explaining the operation of the embodiment of the invention shown in FIG. 1.

Figure 1:
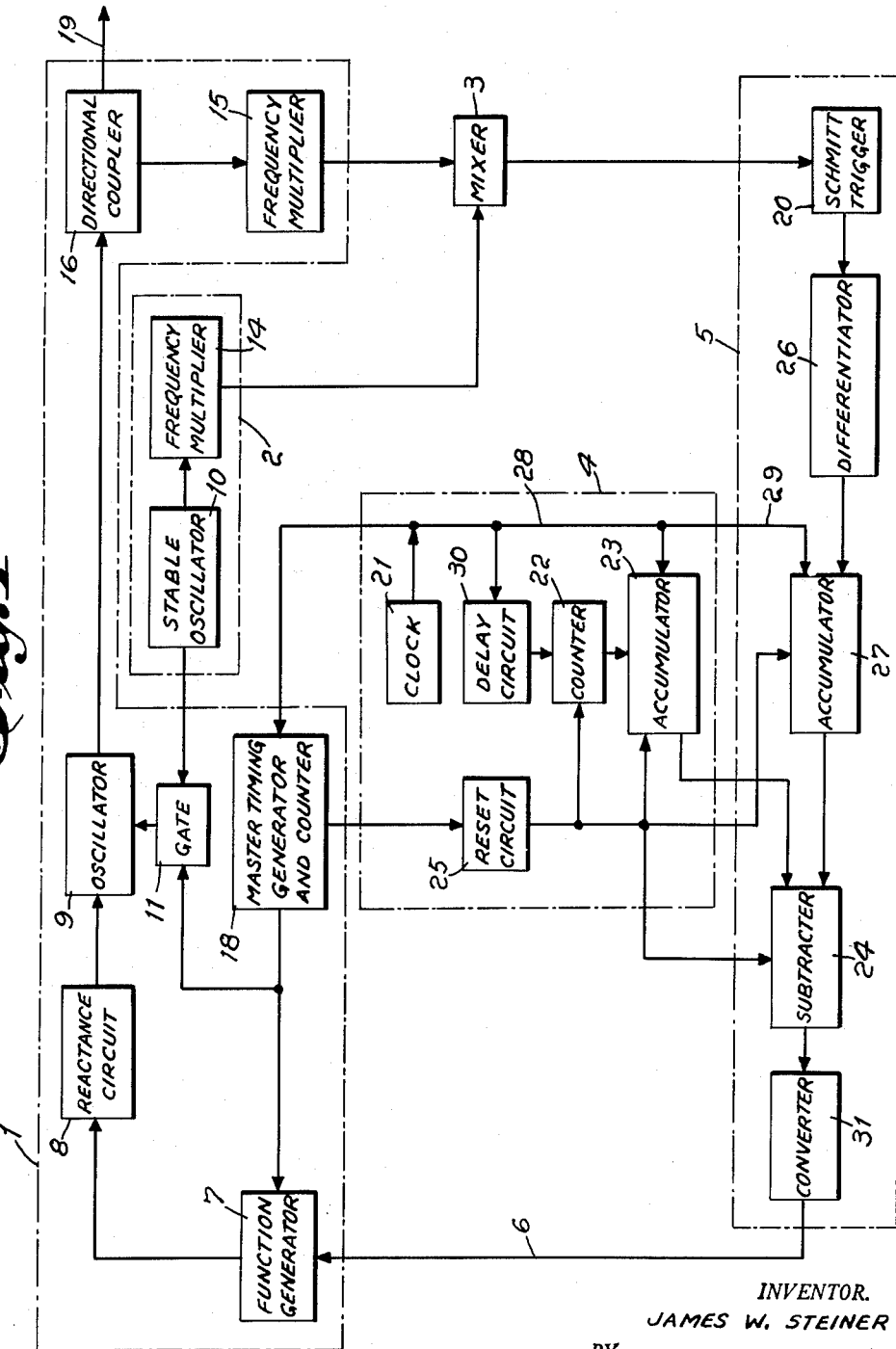
FIG. 1 is a block diagram of one embodiment of a frequency generator system following the principles of the present invention.

Referring to FIG. 1, a frequency generator system is shown whose output frequency varies in a predetermined manner comprising a source of varying frequency signal 1, a source of stable frequency signal 2, mixer means 3 responsive to the varying frequency signal and the stable frequency signal to produce a varying difference frequency signal, means 4 for producing a comparison signal varying in accordance with the desired predetermined variation of the difference frequency signal, means 5 for comparing said comparison signal and said difference frequency signal to produce an error signal upon the occurence of an error in said difference frequency signal, and means 6 to couple said error signal to said source of varying frequency signal to correct for said error.

Frequency generator 1, which produces the sweep frequency signal, includes sawtooth function generator 7, reactance circuit 8 and oscillator 9. The unmodulated output of oscillator 9 may be expressed as:

$$E = E_0 \sin \omega c t \qquad (1)$$

Sawtooth generator 7, however, produces a linearly varying amplitude signal which, through reactance circuit 8, frequency modulates oscillator 9 to produce a linear frequency deviation. Each sawtooth of sawtooth generator 7 is initiated by a signal from master timing generator 18. The desired modulated output from oscillator 9 may be expressed as:

$$E = E_0 \sin\left(\omega c + \frac{\omega m t}{2}\right)t \qquad (2)$$

where $$\frac{\omega m}{2}$$

is the rate of change of frequency deviation expressed in radians per second per second, and is dependent on the amplitude of the sawtooth signal from generator 7. That is, the amplitude slope of the sawtooth signal is selected so as to produce a frequency deviation expressed as $$\frac{\omega m}{2}$$

The desired modulated output from oscillator 9 is not constantly maintainable, however, because the linearity tolerances required in generating the signal represented by Expression 2 are beyond the capabilities of present FM modulators. A means of determining whether the frequency deviation is varying from linearity, and means to correct for the variations when they are present are provided as follows.

A stable crystal oscillator 10 is provided which generates a reference signal identical to the carrier signal expressed by Equation 1, and which is highly stable. Prior to the initiation of the sweep frequency signal oscillator 9 is phase locked to stable oscillator 10 by energy coupled through gate circuit 11. For this purpose, the initial signal from master timing generator 18 at $t=0$ which initiated the sweep frequency signal also momentarily unblocks gate 11, thereby insuring that oscillator 9 and oscillator 10 are phase locked at the initiation of the sweep frequency signal. The frequency of the output signal from oscillator 10 is tripled by multiplier 14 for reasons to be later explained, and the signal from oscillator 9 is coupled to frequency multiplier 15 through directional coupler 16 where the frequency is likewise tripled, also for reasons to be explained.

If the output signal from multiplier 14, expressed as shown in Equaton 2 and the desired output signal from multiplier 15, expressed as shown in Equation 1, are heterodyned in mixer 3, a difference frequency signal will be produced of the form:

$$E_0 \sin\left(\frac{\omega m t^2}{2}\right) \quad (3)$$

this difference frequency signal being the same as the sweep frequency signal with the carrier frequency removed.

The desired difference frequency signal as represented by Equation 3 is a varying sinusoidal function which will have zero values at times corresponding to angles of 0°, 180°, 360°, 540°, etc. which correspond to the expression $n\pi$. An expression for the times at which Equation 3 will have a zero value may be expressed thus.

$$\frac{\omega m t^2}{2} = \frac{2\pi f m t^2}{2} = n\pi \quad (4)$$

where $n = 0, 1, 2, 3 \ldots \infty$
therefore, the desired difference frequency signal as represented by Equation 3 will have zero values at times expressed as:

$$t = \sqrt{\frac{n}{fm}} \quad (5)$$

The actual output signal from multiplier 15, however, will vary due to errors in frequency as discussed hereinabove. This will result in a difference frequency signal that will have zero values at times other than $$t = \sqrt{\frac{n}{fm}}$$

A control system which will monitor the zero value occurrences of the difference frequency signal to provide error correction will now be described. It is to be first noted, however, that Expression 5 will not define equal increments of time as $n$ equals $1, 2, 3, 4, 5 \ldots \infty$. It is desired, for reasons to be later explained, that equal periods of time be defined which are also the times at which Equation 3 has zero values. If $n$ is set equal to $k^2$, where $k = 0, 1, 2, 3 \ldots \infty$, then zeros will occur at times represented by the expression:

$$t = \frac{k}{\sqrt{fm}} \quad (6)$$

which times do define equal periods. However, as $k = 0, 1, 2, 3, 4 \ldots \infty$, $n$ will equal $0, 1, 4, 9, 16 \ldots \infty$, which means that all possible values of $n$, and consequently all possible zero crossings are not contained in the expression $n = k^2$. In order to determine the number of zeros occurring in each of the time periods defined by $$t = \frac{k}{\sqrt{fm}}$$

as $k = 0, 1, 2, 3, 4 \ldots \infty$, the well-known property of squared numbers is employed which is stated thus:

$$N^2 = \sum_{r=1}^{r=N}(2r-1) \quad (7)$$

And adapting Equation 7 to the present problem, the expression becomes:

$$n = k^2 = \sum_{n=1}^{n=k}(2n-1) \text{ where } n = 0, 1, 2, 3, 4 \ldots \infty \quad (8)$$

Thus, for the time periods defined by $k = 0, 1, 2, 3, 4 \ldots \infty$, the total number of zeros occurring may be determined. For example, when $k=1$, $n=1$, which means one time period has elapsed and one zero has occurred. When $k=2$, $n=1+3$ or 4, which means that when two time periods have elapsed, four zeros have occurred. When three time periods elapse, nine zeros will have occurred, and so on.

Of particular interest is the number of zeros occurring in each individual time period. Expression 8 gives the summation of $n$ for each value of $k$, so it follows that for each time period the number of zeros which occur will be given by the expression $(2n-1)$ for each $k^{\text{th}}$ period. Thus, one zero occurs in the first period, three zeros occur in the second period, five in the third, etc. It is important to note that the number of zeros in each time period will always be two greater than the preceding time period.

Referring to FIG. 2, curve 17 illustrates the desired variation of the difference frequency signal as expressed by Equation 3. In the first time period $k=1$ and one zero value occurs at $$t = \frac{1}{\sqrt{fm}}$$

In the second time period $k=2$ and three zero values occur, with one of the zero values occurring at $$t = \frac{2}{\sqrt{fm}}$$

Each succeeding time period will contain two more zero occurrences than the preceding time period, with one of the zeros occurring at $$t = \frac{k}{\sqrt{fm}}$$

The actual deviation of the difference frequency signal will be obtained from the output of mixer 3 by the heterodyning of the sweep frequency signal from multiplier 15 with the very stable version of the carrier signal from multiplier 14. The difference frequency signal from mixer 3 is equal to the actual frequency deviation of the sweep frequency and will contain all the variations from linearity present in the sweep frequency signal.

Employing the knowledge that the desired frequency deviation will exhibit predictable numbers of zero values within predetermined time periods defined by $$t = \frac{k}{\sqrt{fm}}$$

a standard, or comparison signal, can be produced which will have the form of a count of the predicted number of zero values as a function of time, and the zero occurrences of the actual frequency deviation in the form of the difference frequency signal can then be determined for the same predetermined time periods and be compared thereto.

Clock pulse generator 21 is included in comparison signal generator 4 to provide a standard time base for the various operations of the system. Clock 21 generates pulses at predetermined time periods of $$t = \frac{k}{\sqrt{fm}}$$

These clock periods are of equal time intervals, and it is for this reason that the units factor $k$ was employed in deriving time $t$ rather than the unequal factor $n$. The initial pulse from clock 21 starts master timing generator 18 at $t=0$, which thereby initiates the sweep frequency signal by starting the operation of sawtooth generator 7. Prior to the initiation of the sweep frequency signal oscillators 9 and 10 are synchronized by energy coupled through gate 11. The initial pulse from clock 21 through master timing generator 18 also blocks gate 11, and at the same time resets accumulator 27 and subtracter 24 to zero and digital counter 22 and digital accumulator 23 to a value of digital one, by means of reset circuit 25.

As soon as the sweep frequency signal is initiated by the pulse from clock 21, a difference frequency signal equal to the sweep frequency deviation will be produced at the output of mixer 3 as explained hereinabove. The difference frequency signal is applied to a zero counting computer which includes a regenerative type Schmitt trigger circuit 20, a differentiating circuit 26, and a digital accumulator 27. Trigger circuit 20 produces a square wave output signal periodic with the zero crossings of the difference frequency signal. Differentiating circuit 26 will produce output pulses which are coincident in time with the change in polarity of the square wave signal and therefore with the zero values of the difference frequency signal. Accumulator 27 will produce a cumulative digital count of the zero value occurrences represented by the pulses from the output of differentiating circuit 26.

After the first time period has elapsed, which is at $$t = \frac{1}{\sqrt{fm}}$$

clock 21 generates a second pulse. The second clock pulse has no effect on master timing generator 18 or reset circuit 25 due to the inclusion of a counter circuit in generator 18 which produces output signals in response to the initial and final clock pulses only, so the sweep frequency signal will continue. This second clock pulse is coupled to accumulators 23 and 27 through leads 28 and 29, and causes a nondestructive readout signal to be produced from each accumulator. Accumulator 23, as mentioned hereinabove, has been set to a value of plus one, and accumulator 27 should also contain a digital count of plus one, that being the desired number of zero occurrences produced by the output signal from mixer 3 between $t=0$ and $$t = \frac{1}{\sqrt{fm}}$$

The readout signals from accumulators 23 and 27 are fed to digital subtracter 24 where a subtraction of the digital values of the two signals is performed. If the two digital signal values are equal, it is an indication that the expected amount of zero values occurred in the difference frequency signal in the first time period and that the sweep frequency signal is exhibiting the desired linearity, but if the two values are unequal, a finite difference will result indicating the sweep frequency has varied from linearity. The finite difference results in a digital value in the form of an output signal from subtracter 24 which is proportional to the error in the sweep frequency signal. The digital error signal from subtracter 24 is then fed to a digital-to-analog converter 31 where the digital value is converted to an analog error signal, which will also be proportional to the variation from linearity of the sweep frequency signal. The analog error signal from converter 31 is then applied to sawtooth generator 7 to correct for the variations in the linearity of the sweep frequency signal.

The second clock pulse from clock 21 occurring at $$t = \frac{1}{\sqrt{fm}}$$

is also fed to delay circuit 30. Delay circuit 30 delays the clock pulse sufficiently so it does not interfere with the readout operation of accumulators 23 and 27 which has just been described. After sufficient delay, the clock pulse from delay circuit 30 causes counter 22 to increase by a digital count of two. Counter 22 may be of the type that counts in increments of two, and if such is not readily available, a pulse doubler may be provided between delay circuit 30 and counter 22. Such pulse doublers may be, for example, a monostable trigger circuit or merely a delay line in shunt with a direct line through which the input pulse is passed. Since counter 22 has already been set to a value of plus one, the output signal of counter 22 will now be plus three. The count of plus three from counter 22 is fed directly to accumulator 23, which as discussed above, already contains a count of plus one. The plus three and plus one counts produce a total digital count of plus four in accumulator 23.

At time after $$t = \frac{1}{\sqrt{fm}}$$

accumulator 27 continues to count the zero error occurrences of the difference frequency signal from mixer 3. As seen by curve 17 of FIG. 2, the desired zero count between $$t = \frac{1}{\sqrt{fm}} \text{ and } t = \frac{2}{\sqrt{fm}}$$

should be three. If the desired count is realized, the total digital count in accumulator 27 will be one plus three, or four. At the conclusion of the second time period, which is at $$t = \frac{2}{\sqrt{fm}}$$

clock pulse generator produces a third clock pulse which is employed to again read-out accumulators 23 and 27. The readout operation is the same as was described for time $$t = \frac{1}{\sqrt{fm}}$$

The output signal from accumulator 23, which has a value of four, is fed to subtracter 24, as is the output signal from accumulator 23 which should have a value of four. If accumulator 27 does not have an output signal with a value of four, a difference signal having a digital value will be produced in subtracter 24 and then converted to an analog error signal by converter 31. This error signal from converter 31 is likewise fed to sawtooth generator 7 to adjust the frequency deviation in accordance with the error.

The third clock pulse occurring at $$t = \frac{2}{\sqrt{fm}}$$

is also delayed by delay circuit 30 until the readout operation has been completed, and then will pulse counter 22 through acount of two. The additional count of two from counter 22 causes a total count of five (three plus two). The total count of five of counter 22 causes a total count of nine (four plus five) in accumulator 23 which is ultimately subtracted from the signal from accumulator 27 at $$t = \frac{3}{\sqrt{fm}}$$

In a like manner, comparison signal producing means 4 continues to produce a zero count comparison signal and comparison means 5 continues to compare the zero count of the comparison signals with the zero count of the difference frequency signal for increasing periods of time as $k=4$, 5, 6, etc. The desired duration of the sweep frequency signal will determine the maximum number of time periods employed during which the zero occurrences of the difference frequency are sampled and compared with the comparison signal.

Assume, as an example, that the duration of the sweep frequency signal is four time periods. Therefore, when $k=4$ and $$t = \frac{4}{\sqrt{fm}}$$

a final pulse is produced from clock 21. The pulse from clock 21 at $$t = \frac{4}{\sqrt{fm}}$$

will turn off master timing generator 18 and unblock gate 11 as well as provide the final readout signal for accumulators 23 and 27. If it is desired that another sweep frequency signal be transmitted, the entire operation described above is again repeated from $t=0$, that is, clock 21 produces a first pulse which commences the sweep frequency signal, blocks gate 11, and resets counter 22, accumulators 23 and 27, and converter 31. Subsequent clock pulses are then used as the timing and initiating signals for the zero error count, until a selected final clock pulse halts the generation of the sweep frequency signal. A counter is included in master timing generator 18 to permit generator 18 to respond to the initial and final clock pulses only.

The digital number represented by the output signal from subtracter 24 corresponds to the number of zeros by which the frequency deviation signal is in error during a predetermined time period. It follows that each zero by which the frequency deviation is in error corresponds to $\pi$ radians of phase error at the frequency at which the error occurs. However, since the difference frequency signal has been multiplied by three by means of multipliers 14 and 15, the phase error per zero at the transmitted frequency is reduced to $\pi/3$ radians, and finer error control is thereby possible.

Referring to FIG. 3, a time diagram is shown which indicates the sequence of operation of various components of the system of FIG. 1. The first clock pulse occurs at time zero and institutes the first master timing generator pulse and the sawtooth signal, and resets accumulator 23 to zero and accumulator 27 to digital one. The curve illustrating the operation of accumulators 23 and 27 is a pictorial analog of the digital values produced in each accumulator. The second, third, and fourth clock pulses do not affect the master timing generator or the sawtooth signal, but do cause a digital value increase in accumulator 23 in accordance with the discussion hereinabove. The digital values of accumulator 27 increases in accordance with the zero crossings of the difference frequency signal, and the second, third and fourth clock pulses produce a read-out of accumulators 23 and 27 as previously described. The fifth clock pulse also produces a read-out as well as causing a second master timing generator pulse which closes the production of the sawtooth signal. The cycle may be repeated by the sixth clock pulse which performs the same function as the first clock pulse.

It is seen from the above discussion that a system has been developed to provide a sweep frequency output signal which exhibits a high degree of stability. Any variations in the desired frequency deviation can be detected and corrected for by utilizing a high accuracy digital computer which will compute the expected number of zero occurrences of the desired frequency deviation and compare that number with the zero occurrences of the actual frequency. A digital error signal is then produced and converted to an analog error signal to correct for any variations in the desired sweep frequency. The system shown in FIG. 1 and described hereinabove is one wherein the frequency deviation exhibited by the sweep frequency signal is linear, and is produced as a result of modulation by a sawtooth signal. It is to be understood that the present invention as embodied in FIG. 1, with slight modification, can be employed with nonlinear sweep frequency signal generators. If sawtooth generator 7 were to be replaced with a modulator which produced a nonlinear frequency deviation, the output from mixer 3 would nevertheless represent the frequency deviation. Accumulator 27, for predetermined time periods, would produce a zero count at the nonlinear rate; therefore, counter 22 would have to be adjusted to produce a zero count at the desired nonlinear frequency deviation rate.

While I have described above the principles of my invention in connection with specific apparatus, it is to be clearly understood that this description is made only by way of example and not as a limitation to the scope of my invention as set forth in the objects thereof and in the accompanying claims.

I claim:

1. A stabilized sweep frequency generator system comprising a source of constant frequency signal, a source of varying amplitude signal coupled to said source of constant frequency signal to frequency modulate said constant frequency signal to produce a sweep frequency signal, a source of stable frequency signal, mixer means responsive to said sweep frequency signal and said stable frequency signal to produce a varying difference frequency signal, means independent of said source of varying amplitude signal for producing a comparison signal varying in accordance with the predetermined variation of the difference signal, means for comparing said comparison signal and said difference frequency signal to produce an error signal upon the occurrence of an error in the variation of said difference frequency signal, and means to couple said error signal to said source of varying amplitude signal to correct for said error.

2. A stabilized sweep frequency generator system comprising a source of constant frequency signal, a source of sawtooth signal coupled to said source of constant frequency signal to frequency modulate said constant frequency signal to produce a sweep frequency signal, a source of stable frequency signal, mixer means responsive to said sweep frequency signal and said stable frequency signal to produce a linearly varying difference frequency signal, means independent of said source of sawtooth signal for producing a comparison signal varying in accordance with the predetermined variation of the difference signal, means for comparing said comparison signal and said difference frequency signal to produce an error signal upon the occurrence of an error in the linearity of variation of said difference frequency signal, and means to couple said error signal to said source of sawtooth signal to correct for said error.

3. A stabilized sweep frequency generator system comprising a source of sweep frequency signal, a source of stable frequency signal, mixer means responsive to said sweep frequency signal and said stable frequency signal to produce a varying difference frequency signal, first counter means to count the rate of variation of said difference frequency signal, second counter means to count at a predetermined rate, comparison means to compare the output signals of said first and second counter means to produce an error signal upon the occurrence of an error in the rate of variation of said difference frequency, and means to couple said error signal to said source of sweep frequency signal to correct for said error.

4. A stabilized sweep frequency generator system comprising a source of sweep frequency signal including a fixed frequency component and a variable frequency component, a source of stable frequency signal equal to said fixed frequency component, mixer means responsive to said sweep frequency signal and said stable frequency signal to produce a varying difference frequency signal equal to said variable frequency component, first counter means to count the rate of variation of said difference frequency signal, second counter means to count at a predetermined rate, comparison means to compare the output signals of said first and second counter means to produce an error signal upon the occurrence of an error in the rate of variation of said difference frequency, and means to couple said error signal to said source of sweep frequency signal to correct for said error.

5. A stabilized sweep frequency generator system comprising a source of sweep frequency signal including a fixed frequency component and a variable frequency component, a source of stable frequency signal equal to said fixed frequency component, mixer means coupled to said sweep frequency signal and said stable frequency signal to produce a varying difference frequency signal equal to said variable frequency component, said varying difference frequency signal exhibiting recurrent zero values with respect to time, first counting means responsive to said varying difference frequency signal to provide a cumulative count of said zero values, second counting means to produce a given cumulative count with respect to time, subtracter means responsive to said first and second counting means to subtract the outputs therefrom to produce a difference count signal equal to the difference in said cumulative counts, converter means responsive to said subtracter means to convert said difference count signal into an error signal proportional to said difference count, and means to couple said error signal to said source of sweep frequency signal to correct for said difference in said cumulative counts.

6. A stabilized sweep frequency generator system comprising a source of sweep frequency signal including a fixed frequency component and a variable frequency component, a source of stable frequency signal equal to said fixed frequency component, mixer means coupled to said sweep frequency signal and said stable frequency signal to produce a varying difference frequency signal equal to said variable frequency component, said difference frequency signal exhibiting an increasing number of zero values of progressive given time periods, responsive means coupled to said mixer means to produce a pulse signal upon the occurrence of each of said zero values of said difference frequency signal, first accumulator means coupled to said responsive means to produce a cumulative count of said zero value pulse signals, counter means to produce a given increasing number of pulse count signals for said progressive given time periods, second accumulator means coupled to said counter means to produce a cumulative count of said pulse count signals, subtracter means coupled to said first and second accumulator means to subtract the outputs therefrom to produce a difference count signal equal to the difference in said cumulative counts, converter means responsive to said subtracter means to convert said difference count signal into an error signal proportional to said difference count, and means to couple said error signal to said source of sweep frequency signal to correct for said difference in said cumulative counts.

7. A stabilized sweep frequency generator system comprising a source of sweep frequency signal including a fixed frequency component and a variable frequency component, a source of stable frequency signal equal to said fixed frequency component, mixer means coupled to said sweep frequency signal and said stable frequency signal to produce a varying difference frequency signal equal to said variable frequency component, said varying difference frequency signal exhibiting recurrent zero values with respect to time, first counting means responsive to said varying difference frequency signal to provide a cumulative digital count of said zero values, second counting means to produce a given digital cumulative count with respect to time, subtracter means responsive to said first and second counting means to digitally subtract the digital values of the outputs therefrom to produce a digital difference count signal equal to the difference in said cumulative counts, converter means responsive to said subtracter means to convert said digital difference count signal into an analog error signal proportional to said difference count, and means to couple said error signal from said converter to said source of sweep frequency signal to correct for said difference in said cumulative counts.

8. A stabilized sweep frequency generator system comprising a source of sweep frequency signal including a fixed frequency component and a variable frequency component, the frequency of said variable frequency component progressively increasing, a source of stable frequency signal equal in frequency and phase to said fixed frequency component, mixer means coupled to said sweep frequency signal and said stable frequency signal to produce a varying difference frequency signal equal to said variable frequency component, said difference frequency signal exhibiting a progressively increasing number of zero values with respect to predetermined time periods, said number of zero values proportional to the increase in frequency of said variable frequency component, responsive means coupled to said mixer means to produce a pulse signal upon the occurrence of each of said zero values of said difference frequency signal, first digital accumulator means coupled to said responsive means to produce a cumulative count of said zero value pulse signals, a clock generator to produce timing pulses at said predetermined time period, counter means responsive to said clock generator to produce a given increasing number of pulse count signals for said progressive given time periods, second digital accumulator means coupled to said counter means to produce a digital cumulative count of said pulse count signals, digital subtracter means coupled to said first and second accumulator means to digitally subtract the digital values of the outputs therefrom to produce a digital difference count signal equal to the difference in said cumulative counts, converter means responsive to said subtracter means to convert said digital difference count signal into an analog error signal proportional to said difference count, and means to couple said error signal from said converter to said source of sweep frequency signal to correct for said difference in said cumulative counts.

9. A varying frequency generator whose output varies in a predetermined manner comprising a source of varying frequency signal, means responsive to said source to produce a digital signal having a value related to the frequency variations of said source, means to produce a digital reference signal which varies in accordance with the desired predetermined variations of said varying frequency signal, common means coupled to said responsive means and said means to produce to compare the digital signals therefrom to derive an error signal, and means to couple said error signal to said source of varying frequency signal to correct for said error.

10. A varying frequency generator whose output varies in a predetermined manner comprising a source of varying frequency signal, means responsive to said source to digitally count the rate of frequency variation, means to produce a digital reference signal, timing means for controlling said digital reference signal producing means to produce signals at given intervals in accordance with the predetermined variations of said varying frequency signal, means coupled to said responsive means and said means to produce to compare the digital signals therefrom to produce an error signal proportional to the difference between said digital signals, and means to couple said error signal to said source of varying frequency signal to correct for said error.

11. A varying frequency generator whose output varies in a predetermined manner comprising a source of varying frequency signal, a first digital counting means responsive to said source to digitally count the rate of frequency variation, a source of regular timing pulses spaced at predetermined time periods, a second digital counting means responsive to said source of timing pulses to produce a digital reference signal which varies in accordance with the predetermined variations of said varying frequency signal, subtracter means coupled to said first and second digital counting means to compare the digital signals therefrom to produce an error signal proportional to the difference between said digital signals, and means to couple said error signal to said source of varying frequency signal to correct the said error.

12. A sweep frequency generator whose output varies in a predetermined manner comprising a source of sweep frequency signal, means responsive to said source to derive a digital signal therefrom whose value varies as the change of frequency of said sweep frequency signal, means to produce a digital reference signal which varies in accordance with the desired change of frequency of said sweep frequency signal, common means coupled to said responsive means and said means to produce to compare the digital signals therefrom to produce an error signal proportional to the difference between said digital signals, and means to couple said error signal to said source of varying frequency signal to correct the said error.

References Cited in the file of this patent

UNITED STATES PATENTS

| | | |
|---|---|---|
| 2,778,999 | Warriner | Jan. 22, 1957 |
| 2,891,157 | Hansel | June 16, 1959 |
| 2,892,945 | Ule | June 30, 1959 |
| 2,935,609 | Rabin et al. | May 3, 1960 |